Figure 1:
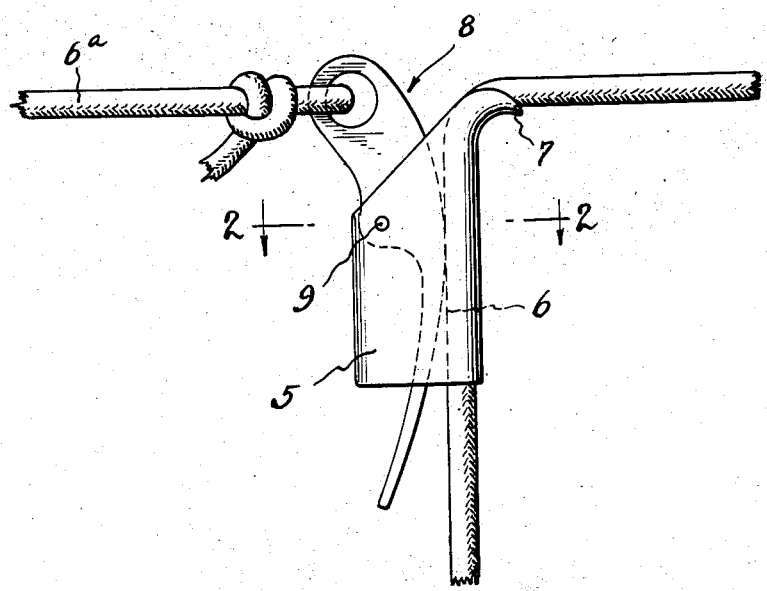

May 7, 1935.  J. KRIES  2,000,891
LINE ADJUSTER
Filed Jan. 18, 1933

JOHN KRIES
INVENTOR

BY Victor J. Evans & Co.
ATTORNEY

Patented May 7, 1935

2,000,891

UNITED STATES PATENT OFFICE 2,000,891

LINE ADJUSTER

John Kries, Glendale, N. Y.

Application January 18, 1933, Serial No. 652,409

1 Claim. (Cl. 24—133)

This invention relates to line adjusters and has reference to a device of the character mentioned adapted to adjust the tension on the line.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claim.

Figure 2:
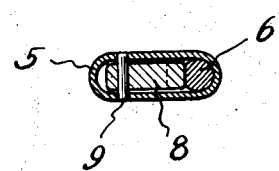

In the drawing:

Fig. 1 is an elevational view of the device showing a line attached thereto, the line being fragmentarily shown; and Fig. 2 is a section taken on line 2—2 of Fig. 1, looking in the direction of the arrows.

Referring to the drawing for a more detailed description thereof, the numeral 5 indicates a tubular member adapted to receive the end portion 6 of a line. The tubular member is provided with a lip 7 extending substantially at right angles to the body so as to accommodate the line at its bend, the lip being curved longitudinally and transversely and having its upper surface concave to fit the line. A cam lever 8 is pivotally connected to the tubular member at 9 and lies within the same with its upper and lower ends beyond said member. The end portion 6a of the line is tied to the upper end of the lever, as shown in Fig. 1. It will readily be appreciated that when the line is in tension the cam lever will press against the portion 6 of the line and hold it within the tubular member, and that the pressure of said lever will be greater, the greater the tension.

When it is desired to increase or diminish the tautness of the line, the lower end of the lever is grasped and pulled towards the left away from the portion 6 of the rope to release the pressure of the lever thereagainst; that part of the line passing through the tubular member is then adjusted in position relative to the tubular member until the line is at the desired tautness, after which the cam lever is allowed to press against the line to hold it in position. It will readily be appreciated that the device described may be connected to adjacent ends of two lines instead of to both ends of one line, the line fragmentarily shown in the drawing being intended as showing both ends of a looped line.

What is claimed is:

A line adjuster comprising a tubular member thru which a line may be passed, and a lever pivotally connected to said member and passing therethrough with ends exposed and adapted when pulled at one end to press a line against said member and when pulled at its other end to release its pressure on the line, said tubular member having a lip extending at an angle to the body portion for the accommodation of the line, said lever having a convex cam surface extending from end to end on the side adjacent the rope and having an aperture in one end thru which a rope may be passed for the purpose of tying, that end of said lever opposite the apertured end being free and sufficiently exposed to constitute a handle portion by which the lever may be moved.

JOHN KRIES.